(12) United States Patent
Segawa et al.

(10) Patent No.: US 7,402,260 B2
(45) Date of Patent: Jul. 22, 2008

(54) NON-AQUEOUS SOLVENT MIXTURE AND NON-AQUEOUS ELECTROLYTIC SOLUTION CONTAINING SUCH MIXTURE

(75) Inventors: Haruki Segawa, Sagimhara (JP); Hideto Yanome, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 276 days.

(21) Appl. No.: 11/085,854

(22) Filed: Mar. 22, 2005

(65) Prior Publication Data

US 2006/0068283 A1      Mar. 30, 2006

(30) Foreign Application Priority Data

Mar. 23, 2004   (JP)   ............... 2004-085379

(51) Int. Cl.
*H01M 10/40*   (2006.01)
(52) U.S. Cl. .................. 252/62.2; 252/364; 106/311; 361/503; 361/504; 361/505; 429/326; 429/327; 429/328; 429/329; 429/330; 429/331; 429/332; 429/334; 429/335; 429/322
(58) Field of Classification Search ........... 252/62.2, 252/364; 106/311; 429/326–343; 361/503–505
See application file for complete search history.

(56) References Cited

U.S. PATENT DOCUMENTS 3,452,100 A * 6/1969 Bennett et al. ............. 568/26

| | | |
|---|---|---|
| 5,998,065 A | 12/1999 | Tsutsumi et al. |
| 6,210,835 B1 | 4/2001 | Arai |
| 6,478,979 B1 | 11/2002 | Rivers et al. |
| 6,696,202 B2 | 2/2004 | Arai |
| 2001/0010877 A1 | 8/2001 | Arai |
| 2003/0180611 A1 | 9/2003 | Mikhaylik et al. |
| 2005/0188697 A1 * | 9/2005 | Zyhowski et al. ............ 60/671 |

FOREIGN PATENT DOCUMENTS

| | | |
|---|---|---|
| JP | 9-293533 | 11/1997 |
| JP | 11086631 | 3/1999 |
| JP | 11-307123 | 11/1999 |
| JP | 2003068244 | 3/2003 |
| WO | WO 2004/086549 | 10/2004 |

* cited by examiner

*Primary Examiner*—C. Melissa Koslow

(57) ABSTRACT

A non-aqueous mixture solvent for a non-aqueous electrolytic solution to be used for electrochemical energy devices, which contains an aprotic solvent, and a fluorinated ketone of the formula:

$$R_f^1-\overset{O}{\underset{\|}{C}}-(Q-\overset{O}{\underset{\|}{C}})_n-R_f^2 \quad (I)$$

(wherein $R_f^1$ and $R_f^2$ each independently represents a fluorinated aliphatic group, or $R_f^1$ and $R_f^2$ together form a cyclic group, Q represents a fluorinated or non-fluorinated alkylene group or a bond, and n represents 0 or 1), and an electrolytic solution containing the mixture solvent.

7 Claims, 1 Drawing Sheet

NON-AQUEOUS SOLVENT MIXTURE AND NON-AQUEOUS ELECTROLYTIC SOLUTION CONTAINING SUCH MIXTURE

This application claims priority from JP Application No. 2004-085379, filed Mar. 23, 2004.

FIELD

The present invention relates to a non-aqueous solvent mixture used for a non-aqueous electrolytic solution for electrochemical energy devices, and to a non-aqueous electrolytic solution containing the solvent mixture.

BACKGROUND

Among electrochemical energy devices, examples of cells having a 1.5 V or higher charging or discharging voltages include lithium primary cells, secondary cells, lithium ion secondary cells, and electro-double layered capacitors of large-volumetric types. Water cannot be used as an electrolyte solvent for these high voltage electrochemical energy devices because water is electrolyzed at such high voltages. Therefore, an aprotic solvent, such as alkyl ester carbonate, alkyl ether in which carrier electrolyte is dissolved, is used for the electrolyte solvent. Similarly, a non-aqueous electrolytic solution is used even for a cell which has a voltage of no greater than 1.5 V, because when electrodes in which occluded or discharged lithium is used, the lithium species active in electrodes react easily with water.

However, due to the combustible nature of aprotic solvents there is a risk that upon leaking outside of the cell the electrolyte solution will catch fire because of heat generation caused by unusual charge or discharge. Electrochemical energy devices are commonly used as main electric sources for portable small electronic devices such as notebook computers and mobile phones, or as memory back-up sources for these devices, and they are widely used by ordinary consumers. Accordingly, the tendency of such devices to catch fire is an acute issue. When large-sized electrochemical devices are used as main or auxiliary electric sources for motor-driven automobiles, or as electric power storing stationary devices, the danger of catching fire at emergency is increased.

Conventional methods for making non-aqueous electrolytic solutions to be flame resistant are, for example, as follows:

Japan Unexamined Patent Publication No. 9-293533 discloses a method in which 0.5 to 30 weight percent of fluorinated alkane having 5 to 8 carbon atoms is incorporated into a non-aqueous electrolytic solution. Generally, fluorinated alkanes, particularly perfluorinated alkanes are not combustible and they may impart flame resistance as a result of a blanket of the volatile gas tending to choke off combustion sources. However, the fluorinated alkane has no other beneficial effect to the electrochemical cell other than imparting flame resistance to the solution. Furthermore, fluorinated alkanes, particularly the perfluorinated alkanes, will not readily dissolve in the aprotic solvent as is necessary to create effective electrolytic solutions for use in electrochemical energy devices. Because the incombustible fluorinated alkane phase separates from the combustible aprotic solvent phase, the entirety of the electrolytic solution cannot be said to be flame resistant. In addition, the separated fluorinated alkane phase is likely to be positioned lower than the aprotic solvent phase because of its relatively higher specific gravity. As a result, the incombustible layer phase will not effectively choke a fire in the aprotic phase. Furthermore, because the carrier electrolyte will not dissolve well in the fluorinated alkane phase, ions and electrons are not effectively exchanged and are occluded at the inter-phase region between electrodes and the electrolytic solution, resulting poorly performing electrochemical energy devices.

Japan Unexamined Patent Publication 11-307123 discloses a method of using a hydrofluoroether, such as methyl nonafluorobuthyl ether. The hydrofluoroether itself is incombustible and is readily soluble in a hydrocarbon solvent. Thus, the hydrofluoroether can be used to produce a uniform, non-aqueous electrolytic solution having flame resistant characteristics. However, the flame resistant mechanism derives mainly from the fire choking effect of the volatile constituent of the hydrofluoroether, just as the case with the fluorinated alkane, and the flame resistance is still insufficient. Further, the non-aqueous electrolytic solution should contain a sufficient proportion of hydrofluoroether such as methyl nonafluorobuthyl ether, so that the solution itself may be flame resistant. In fact, the reference teaches that the noncombustible electrolytic solution is obtained by containing 65 volume % or more of methyl nonafluorobuthyl ether based on a total amount of the solvent composition excluding salt. However, the hydrofluoroether tends to be a poor salvation agent of the salt, and as are result such solutions tend to provide less than desired ion conduction properties. Furthermore, when a hydrofluoroether-containing non-aqueous electrolytic solution leaks out from a cell or capacitor, the proportion of the hydrofluoroether in the leaked electrolytic solution tends to decrease, in time to the a level where the solution is no longer flame resistant because the hydrofluoroether has a relatively high vapor pressure and a low boiling point, causing it to vaporize quickly. Furthermore, desired flame resistance may tend to be lost as the fire choking blanket of hydrofluoroether gas dissipates, particularly when exposed to high temperature conditions.

Thus, the need exists for a non-aqueous mixture solvent suitable for use in non-aqueous electrolytic solutions that exhibit effective properties of flame resistance, non-combustibility and self extinction of fire, and which do not impair the performance of electrochemical energy devices, and to provide a non-aqueous electrolytic solution containing the solvent.

SUMMARY OF INVENTION

The present invention provides a non-aqueous solvent mixture well suited for use as non-aqueous electrolytic solution to be used for electrochemical energy devices. Solutions of the invention exhibit effective properties of flame resistance, non-combustibility, and self extinguishing fire characteristics. In addition, they are effective electrolytic solutions and thus may be used in effective electrochemical energy devices.

In brief summary, solvent mixtures of the invention comprise an aprotic solvent, and a fluorinated ketone of the formula:

(I)

wherein $R_f^1$ and $R_f^2$ each independently represents a fluorinated aliphatic group, or $R_f^1$ and $R_f^2$ together form a cyclic group, Q represents a fluorinated or non-fluorinated alkylene group or a bond, and n represents 0 or 1.

In another embodiment, the invention provides a non-aqueous solvent mixture for a non-aqueous electrolytic solution to be used for electrochemical energy devices, which contains an aprotic solvent and fluorinated ketone as discussed above and a hydrofluoro compound composed of carbon atoms, hydrogen atoms fluorine atoms and optionally oxygen atoms.

In another embodiment, the invention provides a non-aqueous electrolytic solution wherein ion dissociative carrier electrolyte is dissolved in the non-aqueous mixture solvent, to be used for electrochemical energy devices.

When the non-aqueous solvent mixture of the invention is used for the non-aqueous electrolytic solution used for electrochemical energy devices, the electrolytic solution has the properties of the flame resistance, non-combustibility and self extinction without giving any damage to the performance of the devices.

BRIEF DESCRIPTION OF DRAWING

The invention will be explained with reference to FIG. 1 which is a graph showing cycle characteristics (discharge capacity/number of cycles) of Examples.

DETAILED DESCRIPTION OF ILLUSTRATIVE EMBODIMENTS

Figure 1:
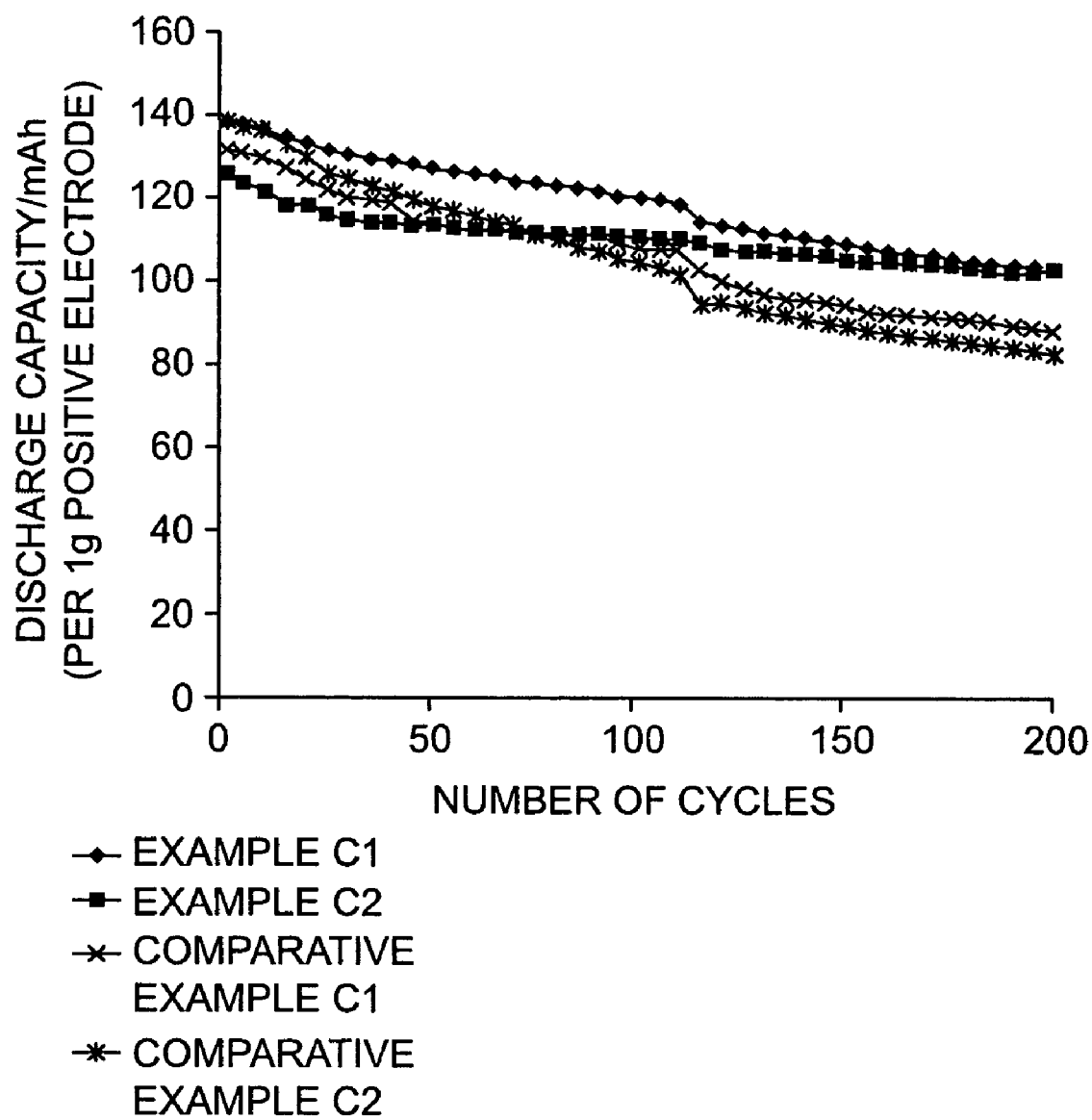

The invention will now be explained in greater detail by the following embodiments.

The non-aqueous solvent mixture and the non-aqueous electrolytic solution of the invention are useful when they are used for electrochemical energy devices such as lithium primary cells, secondary cells, lithium ion secondary cells, and electro-double layered capacitors in which a combustible aprotic solvent (such as alkyl ester carbonates) is used. Devices using the non-aqueous electrolytic solution of the invention have charging and discharging capability of at least the same level as those obtained when a general non-aqueous electrolytic solution comprising only aprotic solvent and carrier electrolyte is used with the added benefits of effective flame resistance, non-combustibility, and self extinguishing fire characteristics.

Aprotic Solvent

Many known aprotic solvents can be used for the present invention. Any aprotic solvent which is normally used for a non-aqueous electrolytic solution can be used herein.

The aprotic solvent may be selected from the group consisting of ethylene carbonate, propylene carbonate, butylene, carbonate acid ester represented by a general formula $R_1OCOOR_2$ (wherein $R_1$ and $R_2$ each represents same or different alkyl group such as a straight-chained or branched alkyl group having 1 to 4 carbon atoms), γ-butylolactone, 1,2-dimethoxyethane, diglyme, triglyme, tetraglyme, tetrahydrofuran, alkyl substituted tetrahydrofuran, 1,3-dioxolane, and alkyl substituted 1,3-dioxolane.

Fluorinated Ketone

The non-aqueous solvent mixture of the invention for the non-aqueous electrolytic solution contains fluorinated ketone by which the electrolytic solution has the properties of flame resistance, incombustibleness and self extinction without being damaged of its charging and discharging features.

More preferably it is used such fluorinated ketone as represented by a general formula $R_f^3COR_f^4$ (wherein $R_f^3$ and $R_f^4$ each represents same or different alkyl group such as a straight-chained or branched alkyl group having 1 to 8 carbon atoms). Illustrative examples of suitable ketones include $C_2F_5COCF(CF_3)_2$ and $(CF_3)_2CFCOCF(CF_3)_2$.

Preferably, the fluorinated ketone is a compound which is highly fluorinated, and particularly a perfluorinated compound is preferable from the view point of flame resistance, non-combustibility and self extinction. But as the degree of the fluorination becomes high, the solubility of the fluorinated ketone with the aprotic solvent tends to decrease. Therefore, a co-solvent may be added to the mixture solvent comprising the aprotic solvent and the fluorinated ketone, as will be described later. Further, when the carbon number (excluding that of ketone group) constituting the fluorinated ketone is too small, the ketone is highly volatile, causing the risk of degrading the properties of maintaining electrochemical devices at high temperatures. Because the ketone is highly volatile, any closed system of the devices may be destructed by the increase of the internal pressure. On the other hand, when the carbon number exceeds 8, the solubility with the aprotic solvent tends to be decreased.

Illustrated examples of fluorinated ketone which are suitable for use in the invention include pentafluoroethyl heptafluoropropyl ketone or bisheptafluoropropyl ketone.

The non-aqueous solvent mixture of the invention contains fluorinated ketone in an amount sufficient to impart the properties of flame resistance, non-combustibility and self extinction to the electrolytic solution without impairing the performance of electrochemical energy devices, and contains the fluorinated ketone normally in an amount of 1 to 40 vol. percent based on the total volume of the solvent mixture.

Hydrofluoro Compound

As has been described above, it is sometimes difficult to make a uniform electrolytic solution by mixing the aprotic solvent (alkyl ester carbonates, for example) with the fluorinated ketone. In such a case, a co-solvent, which has affinity to both of them, may be added to form a stable and uniform non-aqueous electrolytic solution containing the fluorinated ketone. A preferred co-solvent used therefor is a hydrofluoro compound, such as hydrofluoroether and hydrofluorocarbon.

Examples of hydrofluoro compound suitable as co-solvents include a hydrofluoroether or a hydrofluorocarbon. The hydrofluoro-compound is represented, for example, by a general formula $R_3OR_f^5$ ($R_3$ is a straight-chained or branched alkyl group having 1 to 4 carbon atoms, and $R_f^5$ is a straight-chained or branched fluorinated alkyl group having 1 to 8 carbon atoms). Illustrative examples hydrofluoro compound include $CHF_2(OCF(CF_3)CF_2)_x(OCF_2)_yOCHF_2$ (wherein x and y each represents same or different integer from 0 to 10), 1,1,1,2,3,4,4,5,5,5-decafluoropentane, 1,1,2,2,3,3,4-heptafluorocyclopentane, methylnonafluorobutylether (HFE 7100, available from 3M), and ethylnonafluorobutylether (HFE 7200, available from 3M).

The mixture solvent of the invention contains a hydrofluoro compound in an amount sufficient for giving solubility to the aprotic solvent and the fluorinated ketone, and contains the compound in an amount of no more than 50 vol. Percent based on the total amount of the mixture solvent. Preferably, the amount of hydrofluoro compound is 0.1 to 5 times, more preferably 1.0 to 3.5 times as much as the amount of the fluorinated ketone.

Ion Dissociative Carrier Electrolyte

Any ion dissociative carrier electrolyte which is normally used for electrochemical energy devices can be used in the non-aqueous electrolytic solution of the present invention. The electrolyte usable for the invention can be represented, for example, by a general formula AB in which A is an anion and B is any cation of one or more kinds. A can be a compound selected from a group consisting of a compound represented by a general formula $(R_f^6SO_2)(R_f^7SO_2)N^-$ ($R_f^6$ and $R_f^7$ each represents same or different fluorinated alkyl group such as a straight-chained or branched alkyl group having 1 to 4 carbon atoms), a compound represented by a formula $(R_f^8SO_2)(R_f^9SO_2)(R_f^{10}SO_2)C^-$ ($R_f^8$, $R_f^9$ and $R_f^{10}$ each represents same or different fluorinated alkyl group such as a straight-chained or branched alkyl group having 1 to 4 carbon atoms), a compound represented by a formula $(R_f^{11}SO_3)^-$ ($R_f^{11}$ represents a fluorinated alkyl group such as a straight-chained or branched alkyl group having 1 to 4 carbon atoms), $PF_6^-$, $ClO_4^-$ and $BF_4^-$. In the case of a lithium cell, B represents, for example, a metallic ion such as $Li^+$ and $K^+$. From the point of the electric performance, B is preferably $Li^+$. In the case of a capacitor, B is preferred to be an organic cation containing nitrogen, such as a quaternary ammonium cation.

The carrier electrolyte is used in an amount generally adopted for a normal non-aqueous electrolytic solution and there is no particular limitation to the amount.

USES OF THE INVENTION

The solvent mixture of the invention for a non-aqueous electrolytic solution, and the non-aqueous electrolytic solution of the invention containing the solvent mixture, can be used for electrochemical energy devices such as lithium primary cells, lithium secondary cells, lithium ion secondary cells, and electro-double layered capacitors of large-volumetric types. The electrolytic solution is particularly useful for applications where a combustible aprotic solvent is used and where there are risks of catching fire when the electrolytic solution leaks outside by a heat generation due to unusual charge or discharge, or by any breakage. The electrolyte solution of the invention can be used for the main electric sources of mobile electronics such as notebook-type computers and mobile phones, or electric sources for the backup of their memories. Further, the electrolyte solution can be used for larger-sized devices, such as main or auxiliary electric sources of motor-driven automobiles, or as electric power storing stationary devices. The lithium secondary cells include secondary cell which works based on the mechanism that involves oxidation and reduction of lithium contained in the negative electrode material of lithium metal or alloys. The lithium ion secondary cells include secondary cells which works based on the mechanism that involves occlusion and discharge of lithium ion into and out of the negative electrode material such as a graphite.

EXAMPLES

The invention is explained in detail by way of examples. In the examples and comparative examples, the following abbreviations are used:

1. Aprotic solvent
   EC—ethylene carbonate
   DEC—diethyl carbonate
2. Fluorinated ketone
   PFK6—pentafluoroethyl heptafluoropropyl ketone
   PFK7—bisheptafluoropropyl ketone
3. Hydrofluoro compound
   HFE1—methylnonafluorobutylether (Novec™ HFE 7100, from Sumitomo 3M)
   HFE2—ethylnonafluorobutylether (Novec HFE™ 7200, from Sumitomo 3M)
   HF-A—1,1,1,2,3,4,4,5,5,5-decafluoropentane (Vertrel™ XF, from Mitsui Dupont Florochemical)
   HF-C—1,1,2,2,3,3,4-heptafluorocyclopentane (Zeorola™ H, from Nippon Zeon)
4. Other solvents
   PFC—perfluorohexane (Fluorinert™ FC-72, from Sumitomo 3M)
5. Carrier electrolyte
   TFSI—lithiumbis(trifluoromethanesulfonyl)imide (Fluorad™ HQ-115 or Fluorad™ HQ-115J, from by Sumitomo 3M)
   BETI—lithiumbis(pentafluoromethanesulfonyl)imide (Fluorad™ FC-130 or Fluorad™ L-13858, from Sumitomo 3M)
   DBI—lithiumbis(nonafluorobutanesulfonyl)imide
   Triflate—trifluoromethanesulfonic acid lithium (Fluorad™ FC-122, from Sumitomo 3M]), and
   Methide (lithiumtris(trifluoromethanesulfonyl)methide.

A. Compatibility Test

Examples A1-A26 and Comparative Examples A1-A2

Non-aqueous mixture solvents or non-aqueous electrolytic solutions having the compositions shown in Table 1 were prepared at 25° C. and outer appearances of the obtained solutions were observed. The results are shown in Table 1 below.

TABLE 1

Result of Solubility Tests

| Ex. No. | Aprotic solvent 1 (vol. %) | Aprotic solvent 2 (vol. %) | Fluorinated ketone (vol. %) | Hydrofluoro compound (vol. %) | Other solvent (vol. %) | Carrier electrolyte (concentration[1]) | Outer appearance of solution |
|---|---|---|---|---|---|---|---|
| A1 | EC (4) | DEC (36) | PFK6 (17) | HFE1 (43) | | | Transparent & uniform |
| A2 | EC (5) | DEC (45) | PFK6 (14) | HFE1 (36) | | | Transparent & uniform |
| A3 | EC (6) | DEC (44) | PFK6 (14) | HFE1 (36) | | | Transparent & uniform |
| A4 | EC (7) | DEC (43) | PFK6 (14) | HFE1 (36) | | | Transparent & uniform |
| A5 | EC (8) | DEC (52) | PFK6 (11) | HFE1 (29) | | | Transparent & uniform |
| A6 | EC (9) | DEC (71) | PFK6 (6) | HFE1 (14) | | | Transparent & uniform |
| A7 | EC (10) | DEC (70) | PFK6 (6) | HFE1 (14) | | | Transparent & uniform |
| A8 | EC (11) | DEC (69) | PFK6 (6) | HFE1 (14) | | | Transparent & uniform |
| A9 | EC (15) | DEC (75) | PFK6 (3) | HFE1 (14) | | | Transparent & uniform |

TABLE 1-continued

Result of Solubility Tests

| Ex. No. | Aprotic solvent 1 (vol. %) | Aprotic solvent 2 (vol. %) | Fluorinated ketone (vol. %) | Hydrofluoro compound (vol. %) | Other solvent (vol. %) | Carrier electrolyte (concentration[1]) | Outer appearance of solution |
|---|---|---|---|---|---|---|---|
| A10 | EC (4) | DEC (36) | PFK6 (17) | HFE1 (43) | | BETI(1.0) | Transparent & uniform |
| A11 | EC (5) | DEC (45) | PFK6 (14) | HFE1 (36) | | BETI(1.0) | Transparent & uniform |
| A12 | EC (5) | DEC (45) | PFK6 (14) | HFE1 (36) | | | Transparent & uniform |
| A13 | EC (5) | DEC (45) | PFK6 (14) | HFE1 (36) | | | Transparent & uniform |
| A14 | EC (5) | DEC (45) | PFK6 (14) | HFE1 (36) | | | Transparent & uniform |
| A15 | EC (5) | DEC (45) | PFK6 (14) | HFE1 (36) | | BETI (1.0) | Transparent & uniform |
| A16 | EC (5) | DEC (45) | PFK6 (14) | HFE1 (36) | | BETI (1.0) | Transparent & uniform |
| A18 | EC (5) | DEC (45) | PFK6 (14) | HFE1 (36) | | BETI (1.0) | Transparent & uniform |
| A19 | EC (6) | DEC (66) | PFK6 (8) | HFE1 (20) | | TFSI (0.9) | Transparent & uniform |
| A20 | EC (4) | DEC (58) | PFK6 (11) | HFE1 (27) | | TFSI (0.8) | Transparent & uniform |
| A21 | EC (3) | DEC (54) | PFK6 (12) | HFE1 (31) | | BETI (0.7) | Transparent & uniform |
| A22 | EC (4) | DEC (54) | PFK6 (12) | HFE1 (30) | | Triflate (0.8) | Transparent & uniform |
| A23 | EC (4) | DEC (58) | PFK6 (11) | HFE1 (27) | | Methide (0.8) | Transparent & uniform |
| A24 | EC (5) | DEC (45) | PFK6 (14) | HFE1 (36) | | DBI (1.0) | Transparent & uniform |
| A25 | EC (5) | DEC (45) | PFK6 (14) | HFE1 (36) | | | Transparent & uniform |
| A26 | EC (5) | DEC (45) | PFK6 (14) | HFE1 (36) | | BETI (1.0) | Transparent & uniform |
| Comp. Ex. A1 | EC (5) | DEC (45) | | | PFC (50) | | Separated |
| Comp. Ex. A2 | EC (5) | DEC (45) | | | PFC (50) | BETI (1.0) | Separated |

Note
[1])The number of moles of the carrier electrolyte added to 1 litter of a non-aqueous mixture solvent In Examples A1 to A26, tests were carried out for non-aqueous mixture solvents each comprising an aprotic solvent, fluorinated ketone and a hydrofluoro compound, and for non-aqueous electrolytic solutions each comprising further a carrier electrolyte, in addition to the components contained in the mixture solvents. Transparent and uniform solutions were obtained.

In Comparative Examples A1 to A2, PFC was used in place of perfluoroketone and/or hydrofluoro compound used in Examples. A separating phenomenon was observed for each of the obtained solutions.

B. Combustibility Test

Examples B1 to B3 and Comparative Examples B1 to B5

At 25° C., 1 ml of non-aqueous mixture solvent or non-aqueous electrolytic solution of the composition shown in Table 2 was poured into an aluminum dish having an inner diameter of 50 mm and a depth of 15 mm, and a pilot burner having 1 cm diameter was positioned 15 mm above the liquid surface. The pilot burner was slowly moved so that the liquid surface may be evenly exposed to the fire. The burner was moved such that it does not go over the aluminum dish. The burning start time was set from the moment when the burner was placed above the liquid surface to the time when the continuous burning of the mixture solvent starts. The results are shown in Table 2.

TABLE 2

Result of Combustibility Tests

| Ex. No. | Aprotic solvent 1 (vol. %) | Aprotic solvent 2 (vol. %) | Fluorinated ketone (vol. %) | Hydrofluoro compound (vol. %) | BETI(Concentration[1]) | Burning start time(sec.) |
|---|---|---|---|---|---|---|
| B1 | EC (4) | DEC (36) | PFK6 (17) | HFE1 (43) | | 33 |
| Comp. Ex. B1 | EC (4) | DEC (36) | | HFE1 (60) | | 10 |

TABLE 2-continued

| Ex. No. | Aprotic solvent 1 (vol. %) | Aprotic solvent 2 (vol. %) | Fluorinated ketone (vol. %) | Hydrofluoro compound (vol. %) | BETI(Concentration[1]) | Burning start time(sec.) |
|---|---|---|---|---|---|---|
| | | | Result of Combustibility Tests | | | |
| B2 | EC (4) | DEC (36) | PFK6 (17) | HFE1 (43) | 1 | 118 |
| Comp. Ex. B2 | EC (4) | DEC (36) | | HFE1 (60) | 1 | 84 |
| B3 | EC (5) | DEC (45) | PFK6 (14) | HFE1 (36) | | 18 |
| Comp. Ex. B3 | EC (5) | DEC (45) | | HFE1 (50) | | 9 |
| Comp. Ex. B4 | EC (10) | DEC (90) | | | | 5 |
| Comp. Ex. B3 | EC (10) | DEC (90) | | | 1 | 5 |

Note
[1] The number of moles of the carrier electrolyte (BETI) added to 1 litter of a non-aqueous mixture solvent In Comparative Examples B1 to B3, PFK6 as used in Examples B1 to B3 was replaced instead by HFE 1. That is, a comparison of combustion characteristics was made about whether PFK was used or not, when the total amount of the fluorine-containing solvent is same. The result shows that the burning start time was longer for the cases where PFK6 was used than the cases where was not used.

Comparative Example B4 shows a general non-aqueous solvent mixture which contains no fluorine-containing solvent and in which the ratio of EC to DEC is the same as those of Example B1 and Comparative Example B1 (EC/DEC=10/90=4/36). The burning start time of the solvent mixture comprising non-aqueous solvent only, such as Comparative Example B4, is five seconds. Even when only HFE1 is added thereto, such as Comparative Example B1, the time is improved by only 10 seconds. However, when a part of HFE1 is replaced by the same amount of PFK6, the burning start time is greatly improved by 33 seconds. Similar improvements are obtained in the case where Li-BETI is dissolved in the mixture solvent to make an electrolytic solution, as is clear from the result of Comparative Examples B5 and B2, and Example B2.

C. Preparation of Cells and Charging and Discharging Tests

Example C1

Preparation of Positive Electrode: A slurry-like liquid comprising lithium cobaltate as an active substance, acetylene black as a conductive assistant, vinylidene polyfluoride as a binder, and N-methyl-2-pyrrolidone as a solvent was coated onto an aluminum foil and was dried. The resultant product was punched to a disc shape to be used as a positive electrode.

Preparation of Negative Electrode: A slurry-like liquid comprising mesophase carbon microbeads as an active substance, conductive graphite as a conductive assistant, vinylidene polyfluoride as a binder, and N-methyl-2-pyrrolidone as a solvent was coated onto a copper foil and was dried. The resultant product was punched to a disc shape to be used as a negative electrode.

Preparation of non-aqueous electrolytic solution: 1 mol of BETI as a carrier electrolyte was dissolved in a 1 liter of non-aqueous mixture solvent containing 5 vol. percent of ethylene carbonate and 45 vol. percent of diethyl carbonate as aprotic solvents, 14 vol. percent of PFK6 as a fluorinated ketone, and 36 vol. percent of HFE1 as a hydrofluoro compound.

Preparation of a cell: A coin type cell was made by placing a porous propylene film separator between the positive electrode and the negative electrode. The cell has a theoretical capacity of 0.8 mAh calculated based on the amount of the active substances used for preparing the positive and negative electrodes. The amount of the active substances contained in the electrodes was adjusted so that the capacity of the positive electrode is less than that of the negative electrode and that the charge and discharge capacity of the coin cell depends on the capacity of the positive electrode capacity.

Charge and Discharge Pretreatment: A pretreatment operation was repeated three times for stabilizing the surface of the electrodes. The operation comprises a charge with 0.16 mA current at 25° C. until the storage of the cell reaches 4.2V, a ten-minutes pause, a discharge with 0.16 mA current until the storage reaches 2.5V and a ten-minutes pause.

Charge and discharge cycle test: After the pretreatment operation had been carried out, a charge and discharge cycle test was carried out for the cell. At 25° C., a constant current charge was carried out with 0.4 mA current. After the storage reached 4.2V, a constant voltage charge at 4.2V was carried out so that the total charging time amounts to three hours. After a pause of ten minutes, a constant current discharge with 0.4 mA current was carried out until the storage reaches 2.5V, followed by a ten-minutes pause. The above mentioned charge and discharge operation was taken as the first cycle and the cycle was repeated 200 times.

Example C2

The procedure of Example C1 was repeated except that HF-C was used as a hydrofluoro compound in place of HFE1, to produce the non-aqueous electrolytic solution.

Comparative Example C1

The procedure of Example C1 was repeated except that 50 vol. percent of ethylene carbonate and 50 vol. percent of diethyl carbonate were used as aprotic solvents, and that neither fluorinated ketone nor hydrofluoro-compound was used.

Comparative Example C2

The procedure of Example C1 was repeated except that 5 vol. percent of ethylene carbonate and 95 vol. percent of diethyl carbonate were used as aprotic solvents, and that neither fluorinated ketone nor hydrofluoro compound was used.

The initial discharge capacity, i.e., the discharge capacity of the first cycle, is shown in Table 3. The discharge capacity of Examples C1 and C2 each is comparable to that of Comparative Examples C1 and C2. In each of the Comparative Examples C1 and C2, there is comprised a non-aqueous electrolytic solution containing only an aprotic solvent and a carrier electrolyte, which is equivalent to the electrolytic solution for the normally used lithium ion secondary cell. The result is shown in Table 3.

TABLE 3

| | Initial Discharge Capacity |
|---|---|
| | Initial discharge capacity/mAh (per 1 g positive electrode) |
| Ex. C1 | 138 |
| Ex. C2 | 125 |
| Comparative example C1 | 132 |
| Comparative example C2 | 138 |

It is clear that the cell performance is not affected adversely or affected only slightly even if a fluorinated ketone and a hydrofluoro-compound are contained.

FIG. 1 shows charge and discharge cycle characteristics of Examples C1 and C2, and those of Comparative Examples 1 and 2. The graph shows that the cells of Examples C1 and C2 maintain an excellent discharge capacity even after a plurality of cycles have been terminated, and show a high discharge capacity after 200 cycles are terminated, in comparison with that of Comparative Examples C1 and C2. The cells using the electrolyte of the invention have at least the same characteristics as that of conventional cells.

What is claimed is:

1. A non-aqueous mixture solvent for a non-aqueous electrolytic solution to be used for electrochemical energy devices, which contains an aprotic solvent selected from the group consisting of ethylene carbonate, propylene carbonate, butylene, carbonate acid ester represented by a general formula $R^1OCOOR^2$ (wherein $R^1$ and $R^2$ each represents same or different alkyl group having 1 to 4 carbon atoms), γ-butylolactone, 1,2-dimethoxyethane, diglyme, triglyme, tetraglyme, tetrahydrofuran, alkyl substituted tetrahydrofuran, 1,3-dioxolane, and alkyl substituted 1,3-dioxolane, and a fluorinated ketone of the formula:

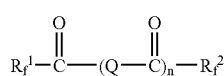
(I)

wherein $R_f^1$ and $R_f^2$ each independently represents a fluorinated aliphatic group, or $R_f^1$ and $R_f^2$ together form a cyclic group, Q represents a fluorinated or non-fluorinated alkylene group or a bond, and n represents 0 or 1.

2. A non-aqueous mixture solvent according to claim 1, wherein said fluorinated ketone is perfluoro-ketone.

3. A non-aqueous mixture solvent for a non-aciueous electrolytic solution to be used for electrochemical energy devices, which contains an aprotic solvent, and a fluorinated ketone of the formula:

(I)

wherein $R_f^1$ and $R_f^2$ each independently represents a fluorinated aliphatic group, or $R_f^1$ and $R_f^1$ together form a cyclic group, Q represents a fluorinated or non-fluorinated alkylene group or a bond, and n represents 0 or 1, wherein said fluorinated ketone is pentafluoroethyl heptafluoropropyl ketone or bisheptafluoropropyl ketone.

4. A non-aqueous mixture solvent according to claim 1, further comprising a hydrofluoro-compound which is composed of carbon atoms, hydrogen atoms and fluorine atoms and which may further contain oxygen atoms.

5. A non-aqueous electrolytic solution for electrochemical devices, wherein an ion dissociative carrier electrolyte is dissolved in a non-aqueous mixture solvent for a non-aqueous electrolytic solution to be used for electrochemical energy devices, which contains an aprotic solvent, and a fluorinated ketone of the formula:

(I)

wherein $R_f^1$ and $R_f^2$ each independently represents a fluorinated aliphatic group, or $R_f^1$ and $R_f^2$ together form a cyclic group, Q represents a fluorinated or non-fluorinated alkylene group or a bond, and n represents 0 or 1.

6. An electrochemical energy devices selected from the group consisting of lithium primary cells, lithium secondary cells, lithium ion secondary cells, and electro-double layered capacitors comprising the non-aqueous electrolytic solution according to claim 5.

7. The non-aqueous mixture solvent according to claim 1 wherein said fluorinated ketone has the general formula:

$$R_f^3 COR_f^4$$

wherein $R_f^3$ and $R_f^4$ each represent the same or different alkyl group having 1 to 8 carbon atoms.

* * * * *

UNITED STATES PATENT AND TRADEMARK OFFICE
CERTIFICATE OF CORRECTION

PATENT NO. : 7,402,260 B2
APPLICATION NO. : 11/085854
DATED : July 22, 2008
INVENTOR(S) : Haruki Segawa It is certified that error appears in the above-identified patent and that said Letters Patent is hereby corrected as shown below:

Column 2,
Lines 8, 17-18, and 21, delete "nonafluorobuthyl" and insert --nonafluorobutyl-- therefor.

Column 2,
Lines 11-12, delete "characeristics." and insert --characteristics.-- therefor.

Column 2,
Line 26, delete "hydrofluorether" and insert --hydrofluoroether-- therefor.

Column 2,
Line 29, before "level" delete "a" therefor.

Column 4,
Line 34, delete "compoundsuitable" and insert --compound suitable-- therefor.

Column 6,
Line 15, delete "Florochemical)" and insert --Fluorochemical)-- therefor.

Column 6,
Line 33, delete "Methide (lithiumtris(trifluoromethanesulfonyl)methide" and insert --Methide lithium tris(trifluoromethanesulfonyl)methide-- therefor.

Column 7,
Line 39, delete "litter" and insert --liter-- therefor.

Column 9,
Line 20, delete "litter" and insert --liter-- therefor.

Column 9,
Line 66, delete "percentof" and insert --percent of-- therefor.

Column 12,
Claim 1, Line 2, delete "$R_f^2$" and insert --$R_f^2$-- therefor.

UNITED STATES PATENT AND TRADEMARK OFFICE
CERTIFICATE OF CORRECTION

PATENT NO. : 7,402,260 B2
APPLICATION NO. : 11/085854
DATED : July 22, 2008
INVENTOR(S) : Haruki Segawa It is certified that error appears in the above-identified patent and that said Letters Patent is hereby corrected as shown below:

Column 12,
Claim 3, Line 8, delete "aciueous" and insert --aqueous-- therefor.

Column 12,
Claim 3, Line 20, "$R_f^1$" and insert --$R_f^2$-- therefor.

Signed and Sealed this

Thirty-first Day of March, 2009

JOHN DOLL
*Acting Director of the United States Patent and Trademark Office*